(12) United States Patent
Wetzel et al.

(10) Patent No.: US 6,516,260 B2
(45) Date of Patent: Feb. 4, 2003

(54) DEVICE AND METHOD FOR STABILIZING A COMBINATION OF A TRACTOR VEHICLE AND AT LEAST ONE SEMITRAILER OR TRAILER

(75) Inventors: Gabriel Wetzel, Stuttgart (DE); Ian Faye, Stuttgart (DE); Klaus-Dieter Leimbach, Eschach (DE); Falk Hecker, Markgroeningen (DE); Oliver Jundt, Besigheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/751,146

(22) Filed: Dec. 29, 2000

(65) Prior Publication Data
US 2001/0032043 A1 Oct. 18, 2001

(30) Foreign Application Priority Data
Dec. 30, 1999 (DE) ............................. 199 64 058

(51) Int. Cl.[7] .................................................. G06F 7/00
(52) U.S. Cl. ............................. 701/50; 701/70; 701/72
(58) Field of Search .............................. 701/1, 29, 38, 701/50, 70, 71, 72, 36, 37, 39

(56) References Cited

FOREIGN PATENT DOCUMENTS

DE          25 47 487          4/1977

OTHER PUBLICATIONS

A. van Zanten et al., "FDR—The Vehicle Dynamics Control of Bosch", AZT Automobiltechnische Zietschrift, 1994 pp. 674–689.*

F. Hecker et al., "Vehicle Dynamics Controller for Commercial Vehicles", SAE 973284, 1997, pp. 59–66.*

* cited by examiner

Primary Examiner—William A Cuchlinski, Jr.
Assistant Examiner—Edward Pipala
(74) Attorney, Agent, or Firm—Kenyon & Kenyon

(57) ABSTRACT

A device and method for stabilizing a combination of a tractor vehicle and least one semitrailer or trailer, the brakes of at least one semitrailer or trailer being set automatically as a function of the yaw rate of the tractor vehicle and the setpoint yaw rate of the tractor vehicle, or as a function of the yaw rate of the tractor vehicle, the speed of the combination and the steering angle.

11 Claims, 2 Drawing Sheets

DEVICE AND METHOD FOR STABILIZING A COMBINATION OF A TRACTOR VEHICLE AND AT LEAST ONE SEMITRAILER OR TRAILER

FIELD OF THE INVENTION

The present invention relates to an exemplary device and an exemplary method for stabilizing a combination of a tractor and at least one semitrailer or trailer. In this connection, the tractor vehicle can be a passenger car or a truck, and a trailer can be a truck trailer or even a trailer for a passenger car, such as for example, a recreational trailer.

BACKGROUND INFORMATION

In German Published Patent Application No. 25 47 487 is discussed a device for stabilizing a vehicle which includes at least one guide part and one propulsion part. In that case, the propulsion part is connected to the guide part by a link. The device has a sensor for sensing the bending angle occurring between the guide part and the propulsion part. A sensor is also provided for measuring the steering angle. The device includes an evaluation circuit to which the signals from the two sensors are transmitted, and which generates an output signal when the bending angle exceeds specified angle magnitudes, which are dependent on the steering angle. The specified angle magnitudes correspond to the bending angle, which is determined as a function of the steering angle, and which is permissible in any particular driving situation. Furthermore, the device is provided with a unit for automatically controlling braking pressure to at least one axle of the propulsion part, the unit being activated by the output signal of the evaluation circuit.

SUMMARY OF THE INVENTION

An object of an exemplary embodiment of the present invention is to provide an improved device and method, respectively, for stabilizing a combination of a tractor and at least one semitrailer or trailer.

In an exemplary embodiment, a combination of a tractor vehicle and at least one semitrailer or trailer may be stabilized by having the brakes of the at least one semitrailer or trailer be set automatically, as a function of the yaw rate of the tractor and the setpoint yaw rate of the tractor. Alternatively, the brakes of the at least one semitrailer or trailer are set automatically, depending on the yaw rate of the tractor vehicle, the speed of the combination and the steering angle, the setpoint yaw rate being advantageously ascertained from the speed of the combination and the steering angle. The calculation of the setpoint yaw rate of the tractor vehicle from the speed of the combination and the steering angle is discussed, for example, in the article, *FDR—Die Fahrdynamikreglung von Bosch* (FDR—The Vehicle Dynamics Control of Bosch), by A. van Zanten, R. Erhardt and G. Pfaff, ATZ Automobiltechnische Zeitschrift, (Journal of Automobile Technology) 96 (1994), 11, pages 674 to 689, or the article, *Vehicle Dynamics Controller for Commercial Vehicles*, by F. Hecker, S. Hummel, O. Jundt, K.-D. Leimbach, I. Faye, and H. Schramm, SAE 973284, 1997, pages 59 to 66. Measuring the bending angle, as may be required, for example, in the design approach of German Published Patent Application No. 25 47 487, is not believed to be necessary here.

According to an exemplary embodiment of the present invention, a combination of a tractor vehicle and at least one semitrailer or trailer may be stabilized by setting the brakes of the at least one semitrailer or trailer, in particular automatically, so that the semitrailer or trailer is braked more strongly than the tractor vehicle when the yaw rate of the tractor vehicle is greater, in particular by a tolerance value, than the setpoint value of the yaw rate of the tractor vehicle. That means that the semitrailer or trailer is braked when the tractor vehicle oversteers. Measuring the bending angle, as may be required, for example, in the design approach of German Published Patent Application No. 25 47 487, is not believed to be necessary here. The subject matter of the exemplary embodiment of the present inventions may be applied to vehicle combinations. This can be a combination including a tractor vehicle and a semitrailer or trailer, or it can be a combination including a passenger car and, for example, a recreational vehicle.

Such a setting of the brakes of the at least one semitrailer or trailer, in which the semitrailer or trailer is braked more strongly than the tractor vehicle when the yaw rate of the tractor vehicle is greater, particularly by a tolerance value, than the setpoint value of the yaw rate of the tractor vehicle, is affected advantageously in that the semitrailer or trailer is braked more strongly than the tractor vehicle when the following holds:

$$|\omega^* - \omega| \geq c1,$$

and $$\text{sign}(\Delta\omega) \neq \text{sign}(\omega)$$

$$\Delta\omega = \omega^* - \omega,$$

and where $\omega$ is the yaw rate, $\omega^*$ is the setpoint yaw rate and $c1$ is the tolerance value.

In an exemplary embodiment of the present invention, the semitrailer or trailer is braked more strongly than the tractor vehicle when the following holds:

$$\text{sign}\left(\frac{d\Delta\omega}{dt}\right) = \text{sign}(\Delta\omega).$$

In a another exemplary embodiment of the present invention, the semitrailer or trailer is braked more strongly than the tractor vehicle when the following holds:

$$\left|\frac{d\Delta\omega}{dt}\right| \geq c2,$$

where $c2$ is an additional tolerance value.

Both tolerance value $c1$ and tolerance value $c2$ can, for instance, be determined in two different ways. In the first way, tolerance value $c1$ and tolerance value $c2$ can each be a single value. This single value is determined by driving experiments and theoretical considerations in the preliminary stage, i.e., within the framework of developing the application. In this case, it is a fixedly specified and nonchangeable tolerance value, which cannot be adapted to the driving situation during vehicle travel.

In the second way, tolerance value c1 and tolerance value c2 can each be stored in the form of a characteristic curve or in the form of a family of characteristics (multidimensional characteristic curve). The characteristic curve, or the family of characteristics, as the case may be, is also determined by driving experiments and theoretical considerations in the preliminary stage, i.e., within the framework of developing the application. For this purpose, the behavior of the vehicle in different driving situations is evaluated with regard to values, appearing in these driving situations, for the terms:

$$|\omega^* - \omega| \text{ or } \left|\frac{d\Delta\omega}{dt}\right|.$$

That means that at different vehicular speeds or at different steering angles or at different coefficients of friction of the road surface, respectively, those values of these terms are calculated, which characterize or correspond to an incipient instability of the vehicle combination, or at which the vehicle combination begins to behave unstably. These values are then stored in the form of a characteristic curve or family of characteristics. The quantities indicated above, namely, vehicular speed, steering angle, and coefficient of friction of the road surface, respectively, are then constantly determined during the operation of the vehicle. These quantities are used as input values for the characteristic curve or family of characteristics. The tolerance value c1 or c2 corresponding to each driving situation is then ascertained as a function of these input variables. Consequently, using this procedure, both tolerance values c1 and c2 are permanently adapted to the prevailing vehicle situation. In this manner, therefore, it is possible to set different tolerance values, for example, for a highway trip (longer time, greater vehicle speed and, with that, no great steering angle changes) than for driving in city traffic (lower vehicle speed, with greater steering angle changes at the same time).

In a another exemplary embodiment of the present invention, the semitrailer or trailer is braked more strongly than the tractor vehicle vehicle when the following holds:

$$|\omega^*-\omega| \geq c1,$$

$$\text{sign}(\Delta\omega) \neq \text{sign}(\omega),$$

$$\text{sign}\left(\frac{d\Delta\omega}{dt}\right) = \text{sign}(\Delta\omega), \text{ and}$$

$$\left|\frac{d\Delta\omega}{dt}\right| \geq c2,$$

where $$\Delta\omega = \omega^* - \omega.$$

In another exemplary embodiment of the present invention, the at least one semitrailer or trailer is essentially braked equally on both sides.

In another exemplary embodiment of the present invention, the setting of the brakes of the at least one semitrailer or trailer as a function of the yaw rate of the tractor vehicle vehicle and the setpoint yaw rate of the tractor vehicle, or as a function of the yaw rate of the tractor vehicle, the speed of the combination and the steering angle is, in particular, immediately discontinued when there has been a change in the algebraic sign of the yaw acceleration. Alternatively, a test is made as to whether the magnitude of the yaw acceleration lies in a small range around zero. This range is defined by a small range around zero, i.e. the range corresponds to the interval from −GB 1 to +GB 1. Consequently, the braking of the semitrailer or trailer is discontinued at the point when, for positive yaw accelerations, the yaw acceleration is less than +GB 1, or when, for negative yaw accelerations, it is greater than −GB1.

Stronger braking of the semitrailer or trailer than of the tractor vehicle, within the context of the exemplary embodiment of the present invention, refers to the semitrailer or trailer being braked, but not the tractor vehicle. If, for certain reasons, for instance due to operation of the brake by the tractor vehicle driver, a braking signal also reaches the brakes of the tractor vehicle, according to the exemplary embodiments of the present invention, the brakes of the semitrailer decelerate the latter more strongly than the tractor vehicle, i.e. the semitrailer or the trailer is braked more strongly than the tractor vehicle.

DETAILED DESCRIPTION

Figure 1:
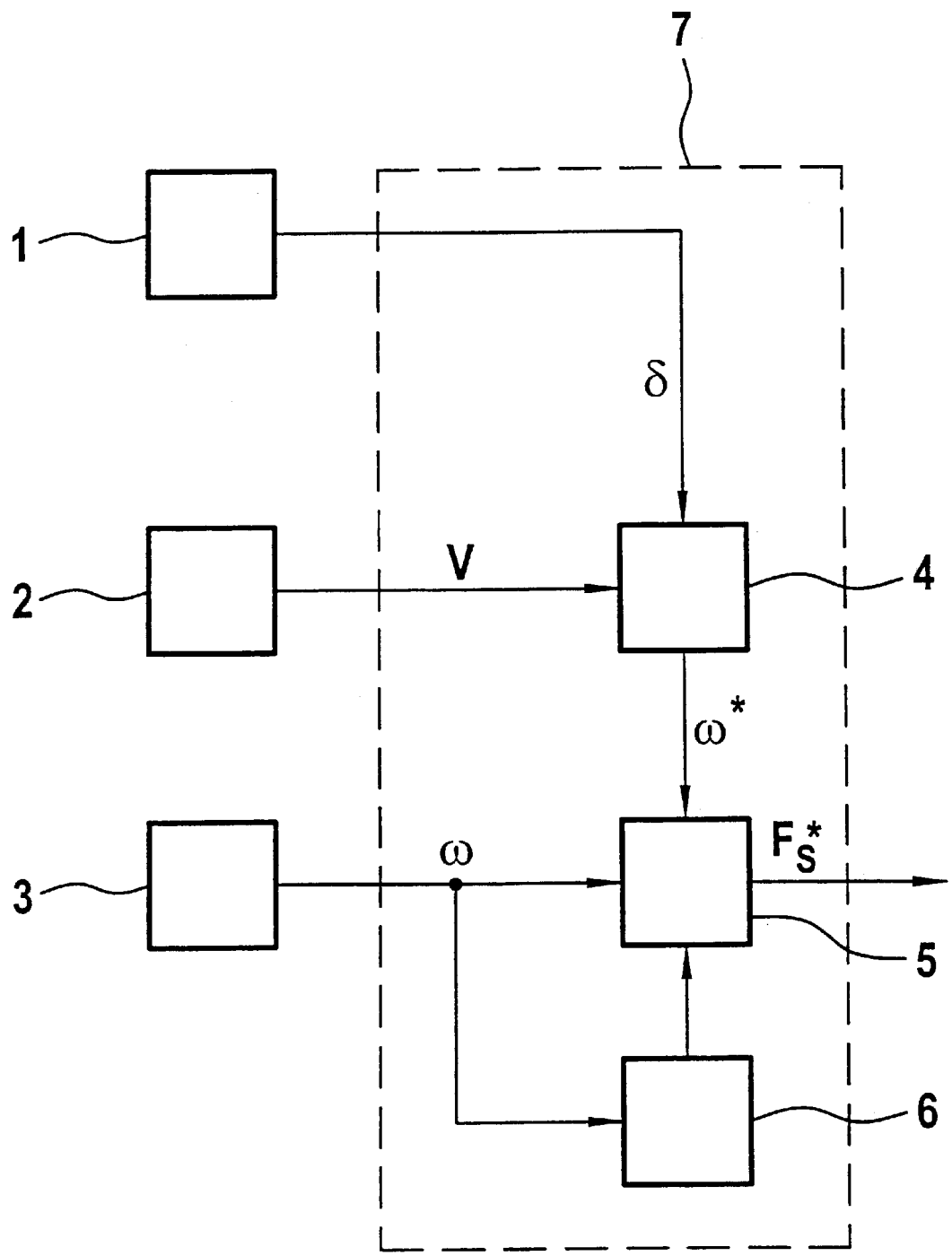
FIG. 1 shows an exemplary embodiment of a braking calculating arrangement according to an exemplary embodiment of the present invention.

FIG. 1 shows an exemplary embodiment of a braking calculating arrangement or structure 7. Braking calculating arrangement or structure 7 calculates a setpoint value $F_s^*$ for the braking force of the semitrailer or trailer as a function of steering angle $\delta$, speed V of the combination of tractor vehicle and semitrailer or trailer, and the yaw rate (D. Steering angle $\delta$ is determined by a steering angle sensor 1. Speed V of the combination of tractor vehicle and semitrailer or trailer is determined by a speed sensor 2. In an alternative exemplary embodiment, speed V of the combination may be determined, in an available manner, as a function of wheel speed ascertained for the tractor vehicle. Yaw rate o) of the tractor vehicle is determined by a yaw rate sensor 3. Setpoint value $F_s^*$ of the braking force is advantageously a signal for controlling brake pressure.

Braking calculating arrangement or structure 7 has a setpoint yaw rate calculator 4, by which the setpoint yaw rate is calculated as a function of speed V of the combination and steering angle $\delta$.

Using a setpoint value/actual value comparator 5, setpoint value $F_s^*$ for the brakes of the trailer or semitrailer is set so that the brakes of the semitrailer or trailer brake the semitrailer or trailer when yaw rate $\omega$ of the tractor vehicle exceeds setpoint value co* of the yaw rate of the tractor vehicle by a tolerance value c1. The braking force is advantageously set by a characteristic curve or by a family of characteristics. For this purpose, the following quantities are evaluated as input variables: Vehicle weight (weight of the trailer or semitrailer, as well as the weight of the tractor vehicle), vehicular speed as well as the coefficient of friction of the road surface on which the vehicle combination is situated. The following relationships shall apply: the greater the weight of the vehicle, the greater the braking force that is to be set; and the lower the coefficient of friction of the roadway, the lower the braking force that is to be set.

Setpoint value/actual value comparator 5 sets setpoint $F_s^*$ for the brakes of the trailer or semitrailer in such a way, that the trailer or semitrailer are braked more strongly than the tractor vehicle when the following applies:

$$|\omega^*-\omega| \geq c1,$$

and $$\text{sign}(\Delta\omega) \neq \text{sign}(\omega),$$

where c1 is the tolerance value.

In another exemplary embodiment, the setpoint value/actual value comparator 5 sets setpoint $F_s^*$ for the brakes of the trailer or semitrailer so that the trailer or semitrailer is braked more strongly than the tractor vehicle when the following applies:

$$|\omega^*-\omega| \geq c1$$

$$\text{sign}(\Delta\omega) \neq \text{sign}(\omega)$$

$$\text{sign}\left(\frac{d\Delta\omega}{dt}\right) = \text{sign}(\Delta\omega), \text{ and}$$

$$\left|\frac{d\Delta\omega}{dt}\right| \geq c2,$$

where $\Delta\omega = *-\omega$.

Figure 2:
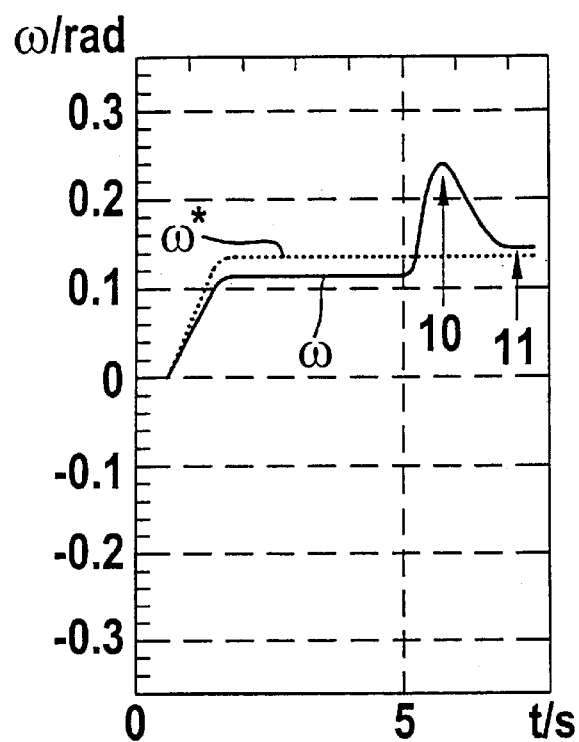
FIG. 2 shows a plot of setpoint yaw rate and actual yaw rate during an exemplary application of the present invention.

FIG. 2 shows a plot of setpoint yaw rate $\omega^*$ and actual yaw rate $\omega$ over time t, during an exemplary use of an exemplary embodiment of the present invention. In this context, reference numeral 10 denotes the point of time at which the following applies:

$$|\omega^*-\omega| \geq c1,$$

and $$\text{sign}(\Delta\omega) \neq \text{sign}(\omega),$$

and the trailer or semitrailer has been decelerated according to an exemplary embodiment of the present invention.

Reference numeral 11 indicates the point of time at which a change in the algebraic sign of yaw acceleration has occurred, after deceleration of the trailer or semitrailer at point of time 10. The braking process begun at time 10 is stopped at time 11.

Figure 3:
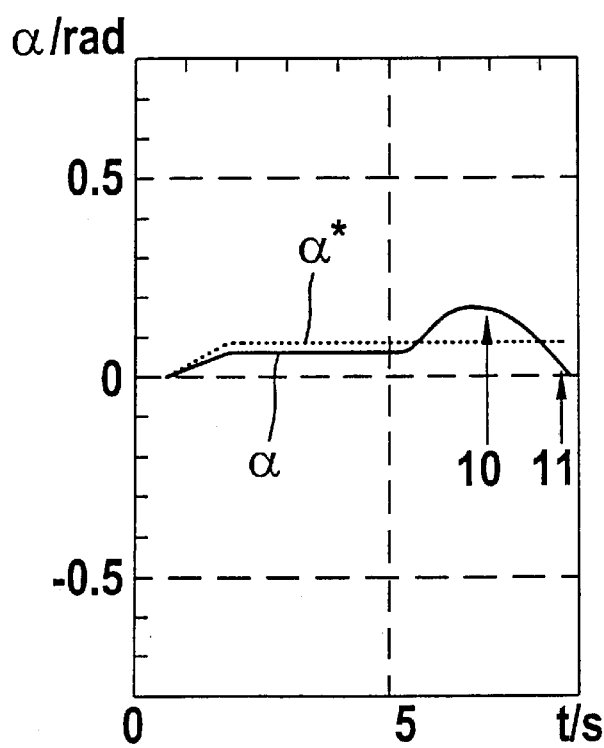
FIG. 3 shows a plot of the bending angle and the setpoint bending angle between the tractor vehicle vehicle and a semitrailer or trailer during an exemplary application of the present invention.

FIG. 3 shows the plot of setpoint articulation angle $\Delta\omega^*$ and actual articulation angle $\Delta\omega$ between the tractor vehicle and a trailer or semitrailer corresponding to the plot of setpoint yaw rate $\omega^*$ and actual yaw rate $\omega$, according to FIG. 2. As shown in FIG. 3, the method according to the present invention makes it possible to stabilize the trailer or semitrailer in a particularly suitable way, even without measuring articulation angle $\Delta\omega$.

What is claimed is:

1. A stabilizing device for stabilizing a vehicle combination of a tractor vehicle and at least one of a semitrailer and a trailer, the stabilizing device comprising:
   a braking calculating arrangement for automatically setting brakes of the at least one of the semitrailer and the trailer as a function of one of:
   a yaw rate of the tractor vehicle and a setpoint yaw rate of the tractor vehicle; and
   the yaw rate of the tractor vehicle, a speed of the vehicle combination and a steering angle.

2. The stabilizing device of claim 1, wherein the braking calculating arrangement automatically sets the brakes of the at least one of the semitrailer and the trailer so that the at least one of the semitrailer and the trailer is braked more strongly than the tractor vehicle when the yaw rate of the tractor vehicle exceeds the setpoint yaw rate of the tractor vehicle by a tolerance value.

3. The stabilizing device of claim 1, wherein the braking calculating arrangement automatically sets the brakes of the at least one of the semitrailer and the trailer so that the at least one of the semitrailer and the trailer is braked more strongly than the tractor vehicle when the following applies:

$$|\omega^*-\omega| \geq c1$$

and $$\text{sign}(\Delta\omega) \neq \text{sign}(\omega),$$

where $\Delta\omega = \omega^* - \omega$, and where $\omega$ is the yaw rate of the tractor vehicle, $\omega^*$ is the setpoint yaw rate of the tractor vehicle and c1 is a tolerance value.

4. The stabilizing device of claim 1, wherein the braking calculating arrangement automatically sets the brakes of the at least one of the semitrailer and the trailer so that the at least one of the semitrailer and the trailer is braked more strongly than the tractor vehicle when the following applies:

$$\text{sign}\left(\frac{d\Delta\omega}{dt}\right) = \text{sign}(\Delta\omega),$$

where $\Delta\omega = \omega^* - \omega$, and where $\omega$ is the yaw rate of the tractor vehicle and $\omega^*$ is the setpoint yaw rate of the tractor vehicle.

5. The stabilizing device of claim 1, wherein the braking calculating arrangement automatically sets the brakes of the at least one of the semitrailer and the trailer so that the at least one of the semitrailer and the trailer is braked more strongly than the tractor vehicle when the following applies:

$$\left|\frac{d\Delta\omega}{dt}\right| \geq c2$$

with $\Delta\omega = \omega^* - \omega$, where c2 is a further tolerance value, $\omega$ is the yaw rate of the tractor vehicle and $\omega^*$ is the setpoint yaw rate of the tractor vehicle.

6. The stabilizing device of claim 1, wherein the braking calculating arrangement slows down the at least one of the semitrailer and the trailer essentially equally on both sides.

7. The stabilizing device of claim 1, wherein:
the braking calculating arrangement aborts the setting of the brakes of the at least one of the semitrailer and the trailer as a function of one of:
the yaw rate of the tractor vehicle and the setpoint yaw rate of the tractor vehicle; and
the yaw rate of the tractor vehicle, the speed of the vehicle combination and the steering angle;
the aborting of the setting occurs immediately after a change in an algebraic sign of a yaw acceleration.

8. A method for stabilizing a vehicle combination of a tractor vehicle and at least one of a semitrailer and a trailer by using a stabilizing device having a braking calculating arrangement, the method comprising the step of:
automatically setting brakes of the at least one of the semitrailer and the trailer as a function of one of:
a function of a yaw rate of the tractor vehicle and a setpoint yaw rate of the tractor vehicle; and
the yaw rate of the tractor vehicle, a speed of the vehicle combination and a steering angle.

9. The method of claim 8, wherein the brakes of the at least one of the semitrailer and the trailer are automatically set so that the at least one of the semitrailer and the trailer is braked more strongly than the tractor vehicle when the yaw rate of the tractor vehicle is greater by a tolerance value than the setpoint yaw rate of the tractor vehicle.

10. The method of claim 8, wherein the at least one of the semitrailer and the trailer is decelerated essentially equally on both sides.

11. The method of claim 8, further comprising the step of:
aborting the setting of the brakes of the at least one of the semitrailer and the trailer as a function of one of:
the yaw rate of the tractor vehicle and the setpoint yaw rate of the tractor vehicle; and
the yaw rate of the tractor vehicle, the speed of the vehicle combination and the steering angle;
wherein the step of aborting occurs immediately after a change in an algebraic sign of a yaw acceleration.

* * * * *